(12) United States Patent
Hermey et al.

(10) Patent No.: US 10,175,124 B2
(45) Date of Patent: Jan. 8, 2019

(54) MONITORING SYSTEM FOR TRACTIVE AND COMPRESSIVE FORCES IN AN ENERGY GUIDING CHAIN AND CORRESPONDING FORCE SENSOR

(71) Applicant: igus GmbH, Cologne (DE)

(72) Inventors: Andreas Hermey, Hennef (DE); Thilo-Alexander Jaeker, Sankt Augustin (DE)

(73) Assignee: IGUS GMBH, Cologne (DE)

( * ) Notice: Subject to any disclaimer, the term of this patent is extended or adjusted under 35 U.S.C. 154(b) by 553 days.

(21) Appl. No.: 14/395,130

(22) PCT Filed: Apr. 19, 2013

(86) PCT No.: PCT/EP2013/058202
§ 371 (c)(1),
(2) Date: Jan. 16, 2015

(87) PCT Pub. No.: WO2013/156607
PCT Pub. Date: Oct. 24, 2013

(65) Prior Publication Data
US 2015/0135845 A1    May 21, 2015

(30) Foreign Application Priority Data
Apr. 19, 2012 (DE) .................... 20 2012 003 907 U

(51) Int. Cl.
*G01L 1/04* (2006.01)
*F16G 13/16* (2006.01)
(Continued)

(52) U.S. Cl.
CPC ................ *G01L 1/04* (2013.01); *F16G 13/16* (2013.01); *G01L 1/2243* (2013.01); *G01L 5/103* (2013.01); *H02G 11/006* (2013.01)

(58) Field of Classification Search
CPC ......... G01L 1/04; G01L 1/2243; F16G 13/16; H02G 11/06
(Continued)

(56) References Cited

U.S. PATENT DOCUMENTS 4,212,360 A * 7/1980 Chesher ............... G01G 19/083
                                                                177/139
4,267,724 A    5/1981 Spoor
(Continued)

FOREIGN PATENT DOCUMENTS

DE          20305619 U1     8/2003
DE       102005033527 A1    1/2007
(Continued)

OTHER PUBLICATIONS

PCT International Search Report dated Aug. 12, 2013, received in corresponding PCT Application No. PCT/EP13/58202, 4 pgs.
(Continued)

*Primary Examiner* — Natalie Huls
(74) *Attorney, Agent, or Firm* — Grossman, Tucker, Perreault & Pfleger, PLLC

(57) ABSTRACT

The invention relates to a monitoring system for tractive and compressive forces in a power track chain (1) for protected guidance of cables, hoses etc. The monitoring system comprises at least one force sensor (10, 90) for measuring a tractive or compressive force transmitted between a driver (4) and a moveable end (3) of the power track chain, and an evaluation unit (12) for evaluating the measurement signals detected by the force sensor. The invention is characterized by the design and arrangement of the force sensor (10, 90). This force sensor is designed as a connecting member for attaching the moveable end (3) of the power track chain (1) on the driver (4) and comprises at least one web (32, 34, 92) extended substantially transversely to the direction of the
(Continued)

Figure 1:
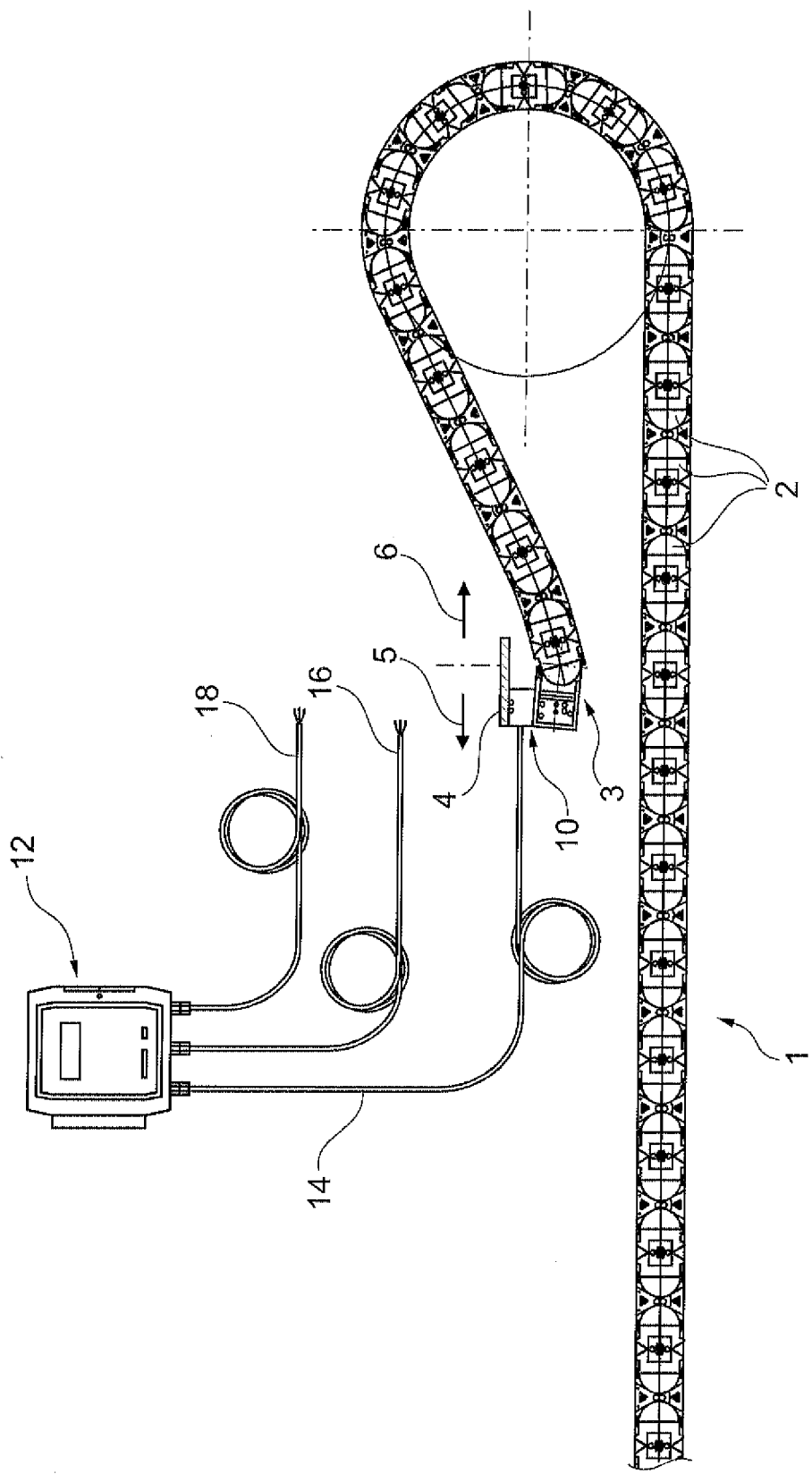

tractive/compressive force. The web has at least one elastically deformable bending region (321, 322, 341, 342) with an associated sensor (621, 622, 641, 642) for measuring deformation produced by bending.

28 Claims, 5 Drawing Sheets

(51) Int. Cl.
    *H02G 11/00*     (2006.01)
    *G01L 1/22*     (2006.01)
    *G01L 5/10*     (2006.01)

(58) Field of Classification Search
    USPC ........ 73/862.381, 862.391, 862.42, 862.451, 73/862.473, 862.474
    See application file for complete search history.

(56) References Cited

U.S. PATENT DOCUMENTS

| | | | | |
|---|---|---|---|---|
| 5,824,963 A | * | 10/1998 | Bruns | G01G 19/083 177/1 |
| 5,872,319 A | * | 2/1999 | Bruns | G01L 1/042 73/862.641 |
| 6,122,978 A | * | 9/2000 | Callendrier | G01L 1/2243 73/862.451 |
| 6,898,988 B2 | * | 5/2005 | Barua | B60N 2/002 73/862 |
| 2002/0139203 A1 | * | 10/2002 | Chimura | G01L 1/2243 73/862.627 |
| 2002/0183148 A1 | * | 12/2002 | Goryca | G01L 5/10 474/114 |
| 2015/0122047 A1 | * | 5/2015 | Riddall | G01L 5/103 73/828 |
| 2016/0348757 A1 | * | 12/2016 | Jaeker | F16G 13/16 |

FOREIGN PATENT DOCUMENTS

| | | | |
|---|---|---|---|
| DE | 102006030824 A1 | | 1/2008 |
| DE | 202008001415 | * | 6/2009 |
| DE | 202008001415 U1 | | 6/2009 |
| EP | 0256392 | * | 2/1988 |
| EP | 0256392 A1 | | 2/1988 |
| EP | 2 839 184 B1 | | 11/2016 |
| WO | 2004090375 A1 | | 10/2004 |

OTHER PUBLICATIONS

PCT Translation of International Preliminary Report on Patentability dated Oct. 30, 2014, received in corresponding PCT Application No. PCT/EP13/58202, 10 pgs.

Notice of Opposition with Certified English language translation dated Feb. 14, 2018, filed against European Patent EP 1 839 184B1, 50 pgs.

Dubbel / W. Beitz and K.-H. Kuttner, "Taschenbuch fur den Maschinenbau"; Berlin Heidelberg New York: Springer Verlag, 1981, Ed. 14.Auflage—ISBN: 3-540-09422-9, p. 1253, section 3.2.1 (excerpt, referred to as reference "E2" in co-pending EPO Opposition proceedings against European Patent EP 2 839 184 B1), 3 pgs. with Certified English translation attached.

* cited by examiner

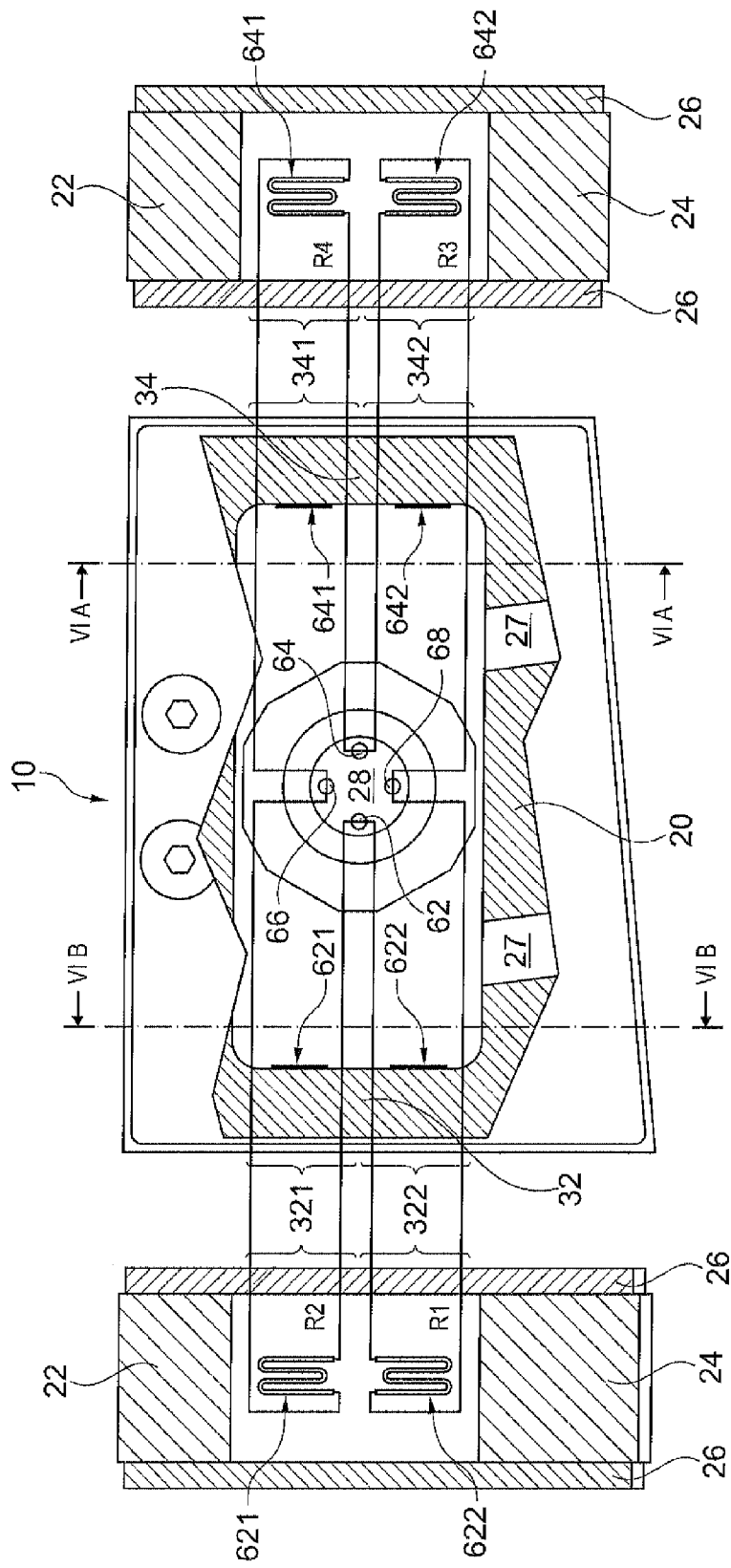

MONITORING SYSTEM FOR TRACTIVE AND COMPRESSIVE FORCES IN AN ENERGY GUIDING CHAIN AND CORRESPONDING FORCE SENSOR

The invention generally concerns a monitoring system for the operation of a energy guide chain comprising a plurality of hingedly interconnected chain link members for protectedly guiding cables, hoses or the like between a first connecting location and a second connecting location moveable relative thereto. The invention concerns in particular a monitoring system for monitoring traction and compression forces in such a energy guide chain as well as a force sensor which is especially suitable for such a monitoring system and which is designed for measuring the traction or compression force transmitted between an entrainment member and a moveable end of the energy guide chain.

By virtue of friction and inertia a movement of the energy guide chain always causes a force in opposition to the movement of the moveable end.

Particularly in the case of long, heavy energy guide chains, for example in the case of load trains for container loading, those forces can assume considerable values. In order to avoid troubles occurring due to excessive forces, a monitoring system of the general kind set forth is known from German Utility Model DE 203 05 619 and International patent application WO 2004/090375.

In that monitoring system in accordance with DE 203 05 619 or WO 2004/090375 a special connecting device is used, which is required as a linear guide and for floatingly mounting the weighing cell used. Such monitoring systems are in the meantime used successfully in many cases, for example in relation to load cranes for container loading. That system however requires a relatively complicated and expensive connecting device of a high inherent weight and special weighing cells of a corresponding unit price.

Accordingly such a system cannot be used in a cost-efficient manner in smaller items of equipment like for example automatic interlinking systems for workpiece transport or in uses in machine tools. However smaller items of equipment also involve an equally pronounced demand for a fail-safe system or protection for the lines guided through the energy guide chain.

Therefore the object of the invention is to provide a less expensive and nonetheless reliable solution for monitoring traction and compression forces in a energy guide chain.

The object according to the invention is attained by a monitoring system in accordance with the combination of features in claim 1 on the one hand and on the other hand also by a connecting member for fixing the moveable chain end to an entrainment member in accordance with the combination of features as set forth in claim 11.

The monitoring system according to the invention is distinguished in that the force sensor is in the form of a connecting member for fixing the moveable end of the energy guide chain to the entrainment member and performs the function of a flexural beam. For that purpose according to the invention the force sensor includes at least one web which is extended substantially transversely relative to the direction of the traction or compression forces occurring in operation at the moveable end, and is accordingly stressed in bending when corresponding forces are involved. In addition the force sensor for performing the function of a flexural beam includes at least one elastically or resiliently deformable flexural region with an associated sensor for measuring the deformation produced by flexing of the flexural region.

The connecting member proposed according to the invention for fixing the moveable end to the entrainment member is accordingly distinguished in that the connecting member itself can in turn be used as a force sensor and thus accordingly has the above-mentioned features.

Because the force sensor itself can be used as a connecting or fixing member for fixing the moveable end to the entrainment member there is no need overall for a complicated and expensive connecting device. This simplified form of fixing permits the force sensor to be designed in accordance with the invention with a flexible web which is stressed in flexing, similarly to the principle of a flexural beam. In addition that design configuration at the same time permits highly informative measurement value detection even in relation to uses involving lower reaction forces.

The flexural beam-like structure of the proposed force sensor for measuring the traction and compression forces also has the advantage that the web extending in the transverse direction provides for using a lever action which permits an increase in the elastic deformation and thus precise measurement even when lower forces are involved. However spring-like elastic deformation is used to denote any flexing which is small in quantity and which can be detected with suitable sensors. In other words the reference to the elastically deformable or flexible flexural region at the transversely extending web, depending on the respective force ranges occurring in operation, is also used to denote a region involving a comparatively great wall thickness, insofar as a certain degree of minimum deformation is ensured in the nominal range of the compression or traction forces.

In a preferred embodiment each force sensor has precisely two respective webs which each include at least one elastically deformable flexural region with associated sensor and which are arranged parallel with the same operative length. Accordingly the two webs represent a parallelogram four bar arrangement which, upon flexing of the webs, does not involve any pivotal movement but ensures parallel displacement of the moveable end of the energy guide chain relative to the entrainment member. A rotary movement inherent in the force-induced flexing is thereby not transmitted to the end of the energy guide chain, that is connected to the entrainment member.

In an embodiment which is inexpensive but nonetheless precise in terms of measurement technology, a strain gauge (SG) is provided as the sensor at at least one elastically deformable flexural region. In an advantageous embodiment having two webs each of the two webs respectively has two series-connected strain gauges. In that case the strain gauges are preferably arranged symmetrically and in diametrically opposite relationship. Particularly preferably the series-connected strain gauges are connected in parallel to constitute a Wheatstone bridge so that the strain gauges of each web are respectively connected in series between the supply terminals of the bridge circuit. That arrangement at least partially permits compensation of unwanted flexural moments and temperature influences. For that configuration each force sensor preferably has two webs which are symmetrical both relative to the transverse plane and also relative to the longitudinal plane. It is however also possible to provide fewer than four strain gauges, for example only two series-connected strain gauges at diametrically opposite flexural regions. Even when using fewer than four strain gauges they are preferably arranged in a bridge circuit, in particular as a Wheatstone bridge. That measuring bridge can be suitably connected to the evaluation unit of the monitoring system by way of a plug connection of the force sensor.

As an alternative to strain gauges (SG) it is also conceivable to use another suitable sensor type, for example piezoelectric, optical or inductive.

To achieve a certain lever action it is advantageous if the web or webs, in respect of their flexural region, has or have an operative length which theoretically can in total be stressed in flexing of at least 20%, preferably at least 25%, in relation to the lever arm with which the reaction force of the chain acts on the entrainment member. Thus, the focus is on the lever arm as the reference parameter, adopted perpendicularly to the direction of force between the fixing location on the entrainment member and the hinge axis of the hinge of the energy guide chain, that is closest in relation to the entrainment member. A deformation which can be measured in practice is still produced by a corresponding minimum length which can be stressed in flexing, even in the case of medium-size and smaller energy guide chains, that is to say, applications involving forces of relatively small values.

The force sensor serving according to the invention as the connecting member or the connecting member serving as the force sensor, apart from the desired inherent flexural stressing, can preferably be used for possibly releasable fixing to the entrainment member. For that purpose it is desirable if there is provided a first flange which is shaped in one piece or one portion with the at least one web or, if provided, with the two webs. Suitable means can be arranged on that flange for fixing the force sensor and the moveable end of the energy guide chain, that is in turn fixed thereto. It is possible for example to provide bores or threads for fixing by means of a screw connection. The first flange then correspondingly serves as a stationary reference point, in relation to which flexing of the elastic flexural region of the at least one web takes place. To apply the traction or compression forces to the force sensor, it is desirable, in the last-mentioned embodiment, if the force sensor further includes a second flange formed in one piece with the at least one or possibly with the two webs. That flange then correspondingly serves for fixing the force sensor to the moveable end of the energy guide chain, for example by means of a further screw connection. To achieve a suitable engagement angle in respect of the forces at the moveable chain end and a favourable operating movement characteristic the second flange preferably has a connecting surface for fixing to the moveable end, which extends inclinedly in comparison with a connecting surface on the first flange, that is to say it extends inclinedly to the plane of movement of the entrainment member. The width of the two connecting surfaces, in particular the connecting surface on the second flange, in a direction perpendicular to the flexural plane or the central plane of the chain, preferably corresponds in that case to the width of the upper narrow side of a side plate member of the energy guide chain to be monitored.

The proposed force sensor can be in the form of a separate connecting member for fixing purposes, that is to say in the form of an intermediate portion between the moveable end of the energy guide chain and the entrainment member. For that purpose, an advantageous embodiment provides that the force sensor includes a frame structure produced in one piece from metal or plastic, in particular from plastic suitable for injection moulding. Upon deformation metal readily ensures adequate proportionality of the measurement value to the force action to be detected. Plastic typically allows less expensive moulding in terms of manufacture. Independently of the material selected the one-piece frame structure at the same time forms the at least one or possibly the two webs. Preferably that frame structure can also integrally represent, together with the webs and oriented perpendicularly thereto, the first flange and possibly also the second flange. In this case the one-piece frame structure serves as a separate connecting member or intermediate portion for fixing the moveable end to the entrainment member. An advantage of this structural configuration is that, in spite of the desired flexibility, it ensures a comparatively stiff or movement-free connection. In addition, with the choice of material remaining the same, it is possible to achieve different degrees of elasticity of the flexural region at each web in dependence on the desired application, by suitable shaping.

When using a connecting member which is provided separately from the moveable end of the chain, it is desirable if the first flange which is to be fixed to the entrainment member has a fixing profile, for example a bore pattern or a drilled hole configuration, which is identical to the fixing profile typically provided at the moveable end of the energy guide chain, in particular in the form of a bore pattern in the narrow side of the end member of the chain.

As an alternative to designing the connecting or force sensor in the form of a separate intermediate portion, it is also in accordance with the invention for the force sensor and in particular the at least one web involving the flexural beam function to be designed in the form of an integrated component of a chain end member. In that case the corresponding end member with force sensor then serves for fixing the moveable end of the energy guide chain to the entrainment member.

The above-described features of the force sensor, in accordance with the invention, are also proposed and claimed as features of the connecting member which is in the form of the force sensor.

The invention also concerns a energy guide chain having a plurality of hingedly interconnected chain link members for protectedly guiding cables, hoses or the like, wherein the chain link members are respectively formed by side plates which are interlinked by the hinged connection to constitute side plate line arrays and are generally connected together by transverse webs. To avoid fracture of the energy guide chain a force sensor according to the invention for fixing the moveable end to the entrainment member is provided at at least one and preferably at both side plate line arrays of the moveable end of the energy guide chain. In the case of applications in which a symmetrical distribution of force to both side plate line arrays is to be assumed to occur, a genuine force sensor can be provided at only one side plate line array. Then the other side plate line array desirably has a simplified, less expensive connecting member involving the same mechanical structure but without sensors for measuring deformation.

Finally the invention consequently also concerns the use of at least one and preferably two corresponding force sensors for measuring the traction or compression forces to be transmitted between the entrainment member and the moveable end.

Figure 2:
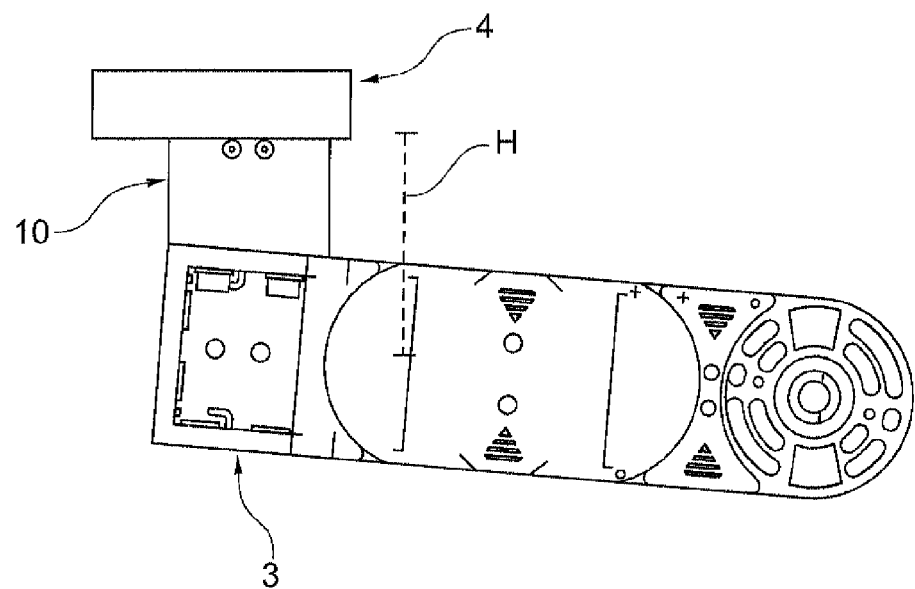
Figure 3:
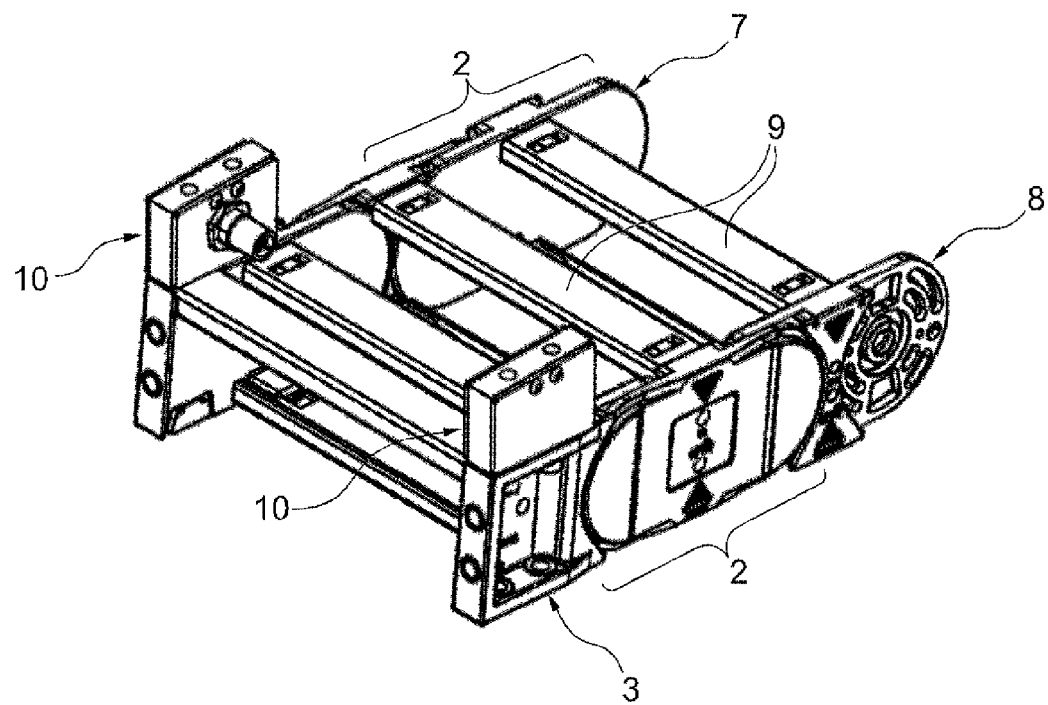
Figure 4:
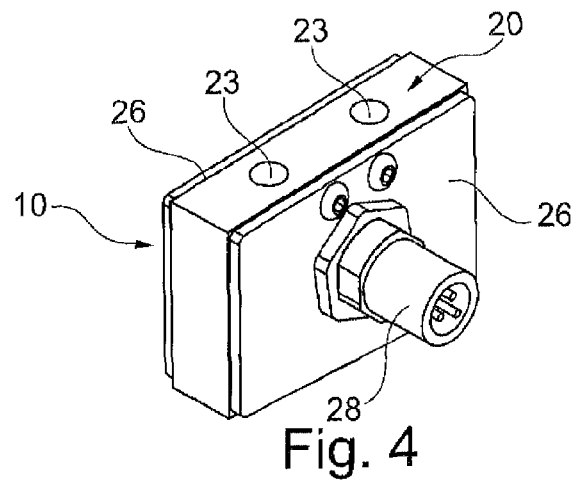
Figure 5A:
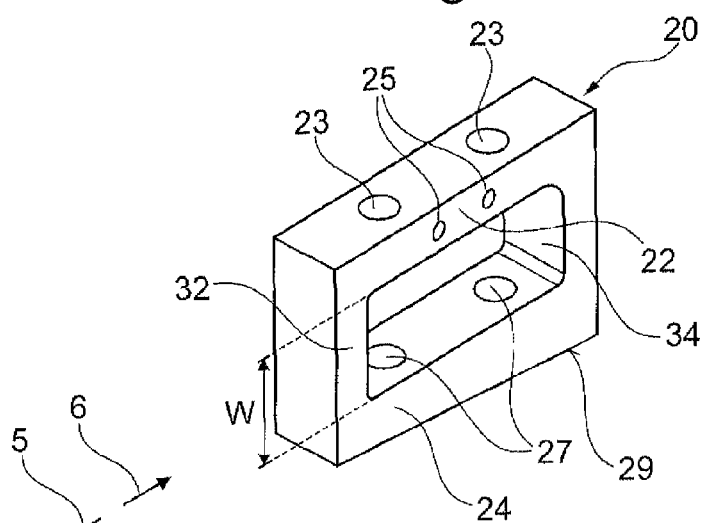
Figure 5B:
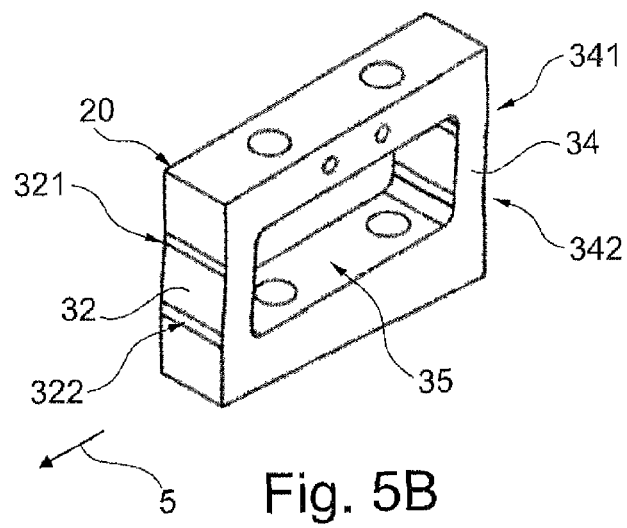
Figure 7:
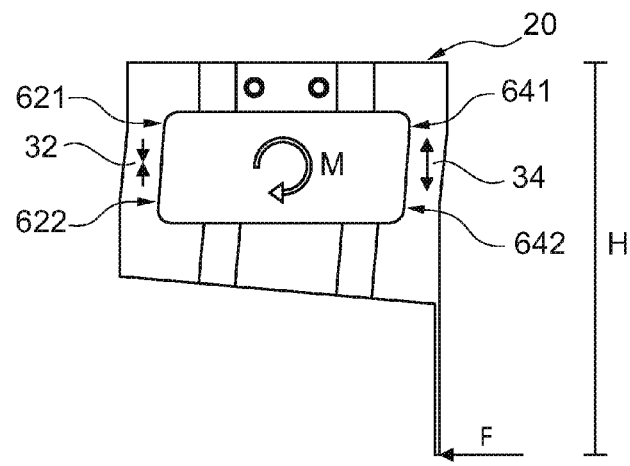
Figure 8:
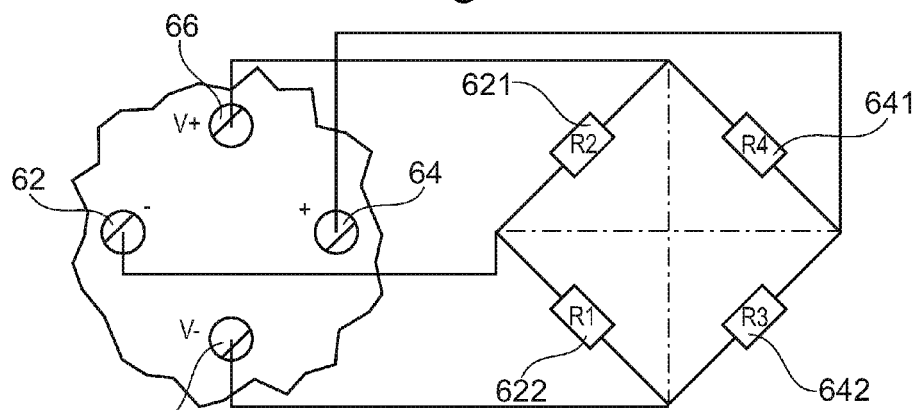

Further details, advantages and features of the invention will be apparent from the description hereinafter of some embodiments by way of example, with reference to the accompanying drawings in which:

FIG. 1 shows a diagrammatic side view of a monitoring system according to the invention, FIG. 2 shows a side view of the moveable end of a energy guide chain which is fixed with a connecting member according to the invention to the entrainment member, FIG. 3 shows a perspective view of the moveable end of a energy guide chain, with a respective connecting member according to the invention at each of the two side plate line arrays for fixing to the entrainment member, FIG. 4 shows an enlarged perspective view of a connecting member according to the invention or force sensor as shown in FIG. 3, FIGS. 5A-5B show diagrammatic perspective views of a one-piece frame structure used in the connecting member or force sensor shown in FIGS. 3-4, FIGS. 6A-6C show a partly broken-away side view and associated vertical sections along section lines VIA and VIB of the connecting member or force sensor shown in FIG. 4, FIG. 7 shows a view of an unwanted moment superimposition in the frame structure shown in FIGS. 5A-5B, FIG. 8 shows an electric circuit diagram of the strain gauges used in the force sensor shown in FIGS. 6A-6C, and FIG. 9 shows a side view of the moveable end of a energy guide chain having a connecting member according to a second embodiment.

FIG. 1 shows a energy guide chain 1 comprising a plurality of hingedly interconnected chain link members 2 and having a moveable end 3 fixed to an entrainment member 4 which is purely diagrammatically shown. The energy guide chain 1 serves in known manner for protectedly guiding cables, hoses or the like between a stationary connecting location (not shown in greater detail) and a moveable connecting location. Provided at the moveable connecting location is the entrainment member 4 which is fixed for example to a moveable machine part (not shown). In the embodiment in FIG. 1 the entrainment member 4 is displaceable as indicated by the arrows 5 and 6 horizontally towards the left or right, or forward and back. The traction and compression forces which are exerted on the energy guide chain 1 in that case are in the same direction 5, 6 and are monitored by a monitoring system which prevents fracture of the energy guide chain 1 and in particular of the lines guided thereby, in the event of an overloading. For that purpose the monitoring system has at least one force sensor 10 and an evaluation unit 12 to which the force sensor 10 is connected by way of the measuring line 14. The evaluation unit 12 is connected by way of a data line 16 to an automation system (not shown) of usual type, and is fed by way of a power line 18. The structure and mode of operation of the evaluation unit 12 can take place in per se known manner, for example in accordance with the description in Utility Model DE 203 05 619. The content in that respect of DE 203 05 619 is incorporated herein by reference thereto. As an alternative to the evaluation procedure proposed therein, which takes account of a dependency between the displacement travel and the nominal force value range, the evaluation unit 12 can evaluate the measured forces in simplified form with fixed limit values, that is to say without information in regard to the position of the moveable end, solely in relation to the fixed limit values.

As can be seen more clearly from FIGS. 2-3 the force sensor 10 according to the invention serves at the same time as a connecting member for fixing the moveable end 3 of the energy guide chain 1 to the entrainment member 4. In other words, the function of a force sensor is integrated at the same time into the connecting member 10.

FIG. 3 is a perspective view showing in greater detail the typical structure of the energy guide chain 1 with two mutually opposite side plate line arrays 7, 8 which are connected together by transverse webs 9. FIG. 3 further shows at the end 3 of each side plate line array 7, 8 of the energy guide chain, a respective force sensor 10 serving for fixing the corresponding side plate line array 7, 8 to the entrainment member 4. Alternatively it is also possible to provide a single force sensor which extends continuously over the entire width of the energy guide chain 1 and which is suitable as a connecting member for fixing to the entrainment member 4 and at the same time for implementing force measurement.

FIG. 4 and FIGS. 5A-5B show perspective views illustrating the structure of the force sensor or connecting member 10. The main component is formed by a frame-like structure 20. The frame structure 20 is produced in one piece for example by suitable CNC machining of a blank from aluminium. The frame structure 20 has a first upper flange 22 and an oppositely disposed second lower flange 24. Provided in the first flange 22 are fixing bores 23 for making a screw connection to the entrainment member 4. The fixing bores 23 are preferably disposed in accordance with the same bore pattern or the same drill hole configuration as the fixing bores typically provided for fixing to the end member of the moveable end 3, such that no change is required on the entrainment member 4 or the part to be supplied, when retro-fitting it with force sensors 10.

The first flange 22 further includes female threads 25 perpendicularly to the wide sides, which serve for screwing on side covers 26 to the stationarily fixed first flange 22. Provided at the side cover 26 which is disposed inwardly relative to the energy guide chain 1 is a connecting socket 28 for the measurement line 14. Sensor devices provided in the force sensor 10 as shown in FIGS. 6A-6C can be connected to the evaluation unit 12 by means of the connecting socket 28.

For fixing the force sensor or the connecting member 10 to the corresponding side plate line array 7, 8 of the moveable end 3, the second flange 24 is provided with two further fixing bores 27. In relation to the inclined lower connecting surface 29 of the second flange 24, the fixing bores 27 are also provided in the same bore pattern as the fixing bores 23 on the first flange 22. The connecting surface 29 on the second flange is not parallel but is inclined in relation to the corresponding connecting surface on the first flange 22. That produces an engagement angle, that is advantageous in terms of application of force, in respect of the end member at the moveable end 3 of the energy guide chain 1. The two connecting surface can also converge in a trapezoidal shape to produce the angle of force engagement. Alternatively the connecting surface 29 can also be parallel to the upper connecting surface on the first flange 22.

As can best be seen from FIG. 5A the force sensor or the connecting member 10, more precisely its frame structure 20, has two webs 32, 34 extending perpendicularly to the direction 5, 6 of the traction and compression forces at the moveable end 3. When the moveable end 3 of the energy guide chain 1 is fixed to the entrainment member 4 then, upon movement of the entrainment member 4, the webs 32, 34 extending transversely relative to the action of the force are thus subjected to a flexural stress. In order to permit measurement of a deformation produced by flexing each web 32, 34 has at least one and preferably, as shown in FIG. 5B, two, elastically deformable flexural regions 321, 322 and 341, 342 respectively. The flexural regions 321, 322; 341, 342 respectively extend approximately between the transition to the flanges 22, 24 and the centre of the operative length W of the webs 32, 34. For illustration purposes, FIG. 5B diagrammatically shows a loaded condition involving flexing in the region of the transversely extending webs 32, 34, that is to say there is an elastic reversible deformation in the flexural regions 321, 322; 341, 342. That elastic deformation is dependent on the reaction force of the energy guide chain 1, for example in accordance with the direction indicated by the arrow 5, which is produced by virtue of the force exerted by the entrainment member 4. For comparison purposes FIG. 5A shows the unloaded condition of the frame structure 20, which does not involve any flexing of the webs 32, 34.

As shown by a comparison of FIGS. 5A and 5B, the two webs 32, 34 are arranged parallel and involve the same operative length W. That ensures, as FIG. 5B shows, that the situation always involves parallel displacement of the moveable end 3, in particular the end member of the energy guide chain 1, relative to the entrainment member 4. The webs 32, 34 with their flexural regions 321, 322; 341, 342 cooperate with the flanges 22, 24 in the manner of a parallelogram four bar mechanism. The engagement angle of the end member at the moveable end 3 with respect to the entrainment member 4 thereby remains unchanged, even upon flexing of the frame structure 20.

FIGS. 5A-5B further show a central opening 35 which imparts a frame-like shape to the frame structure 20. The desired elasticity of the flexural regions 321, 322; 341, 342 can be adjusted by suitable shaping of the opening 35, depending on the respective use and the respective material adopted for the frame structure 20. With suitable shaping by metal machining or plastic injection moulding it is possible for example by taper configurations (not shown) to impart to the flexural regions 321, 322; 341, 342 a flexibility which is especially adapted to the forces nominally occurring in operation of a given energy guide chain 1. The central opening 35 is preferably of a symmetrical configuration with respect to the vertical and horizontal central planes of the frame structure 20 in order to produce correspondingly symmetrical flexural regions 321, 322; 341, 342 which inter alia achieve a parallelogram action. FIG. 5A correspondingly shows the operative length W which theoretically can be subjected to maximum flexural stress and which is selected to be the same for both webs 32, 34 to ensure the above-described parallel displacement of the second web 24.

To achieve a suitable compromise between the stiffness of the webs 32, 34 and their flexibility the magnitude of the operative length W is so selected that it is at least 20%, preferably at least 25%, of the lever arm implementing the flexing action, as shown in FIG. 2. In this respect the lever arm H is measured between the engagement points of the forces, for example between the hinge axis of the hinge of the energy guide chain 1, that is closest to the entrainment member 4, and the fixing plane on the entrainment member 4. The connecting member or force sensor 10, acting as an intermediate portion, as shown in FIG. 2, thus overall increases the lever arm H and is preferably such that the ratio W/H observes a certain minimum value, preferably W/H≥0.2.

FIGS. 6A-6B show a preferred arrangement wherein a respective corresponding strain gauge (SG) 621, 622; 641, 642 is associated with the webs 32, 34, in particular the flexural regions 321, 322; 341, 342, as sensor devices for measuring the deformation produced by flexing. As can be seen from the partly broken-away side view in FIG. 6C, the strain gauges 621, 622; 641, 642 are respectively fixed to the inside of the webs 32, 34 with a suitable adhesive. In that case the strain gauges 621, 622; 641, 642 are fixed symmetrically in the region of the corresponding flexural regions 321, 322; 341, 342, in relation to the vertical and horizontal central planes of the frame structure 20. The side covers 26 serve to protect the strain gauges 621, 622; 641, 642 from unwanted influences.

FIG. 7 diagrammatically shows the superimposition of a tilting moment M produced by the inherently present lever arm H in the event of a reaction force in respect of the moveable end 3. An opposed tilting moment correspondingly occurs, with the sign reversed, when a traction force is exerted on the moveable end 3 of the energy guide chain 1. Due to the moment M which is actually unwanted, an upsetting compression effect occurs in the one web 32 in the longitudinal direction of the web, while conversely a stretching effect occurs in the longitudinal direction in the other web 34. That compressive upsetting and stretching shown by double-headed arrows in FIG. 7 in the longitudinal direction of the webs 32, 34 adversely affects the flexural-induced deformation which is actually wanted at the inside surfaces of the flexural regions 321, 322; 341, 342.

FIG. 8 shows an arrangement, which is advantageous in terms of measurement technology, of the strain gauges 621, 622; 641, 642, in the form of a Wheatstone bridge. In the FIG. 8 arrangement the two strain gauges 621, 622 arranged at the first web 32 are connected in series with connecting contacts 66, 68 for a power supply source, diagrammatically indicated by V+ and V−. The two strain gauges 641, 642 at the opposite second web 34 are also connected in series with the connecting contacts 66, 68 of the power supply source. In the event of the desired, flexurally induced deformation as shown in FIG. 5B, the respective diagonally opposite strain gauges 621, 642 or 622, 641 are respectively both stressed in paired relationship either in respect of stretching or in respect of compressive upsetting. Due to the arrangement which is preferred as shown in FIG. 8 in the measurement bridge circuitry the stretching or upsetting side-effect of the unwanted moment M shown in FIG. 7 is distributed in terms of measuring technology to the individual strain gauges 621, 622; 641, 642 in such a way that the troublesome effect of the moment M is approximately compensated in relation to the diagonally opposite pairs of strain gauges 621-642 and 622-641 respectively.

The corresponding circuit arrangement of the strain gauges 621, 622; 641, 642 in the form of a measuring bridge is also illustrated in FIGS. 6A-6C. FIG. 6C also shows connecting contacts 62, 64 of the measuring bridge, at which actual signal measurement for determining the force occurs. FIG. 6C also shows the connecting contacts 66, 68 of the connecting socket 28, to which the power supply source, for example a constant voltage source, is connected. In this case signal measurement and power supply are implemented by way of the measuring line 14 by the evaluation unit 12.

Figure 9:
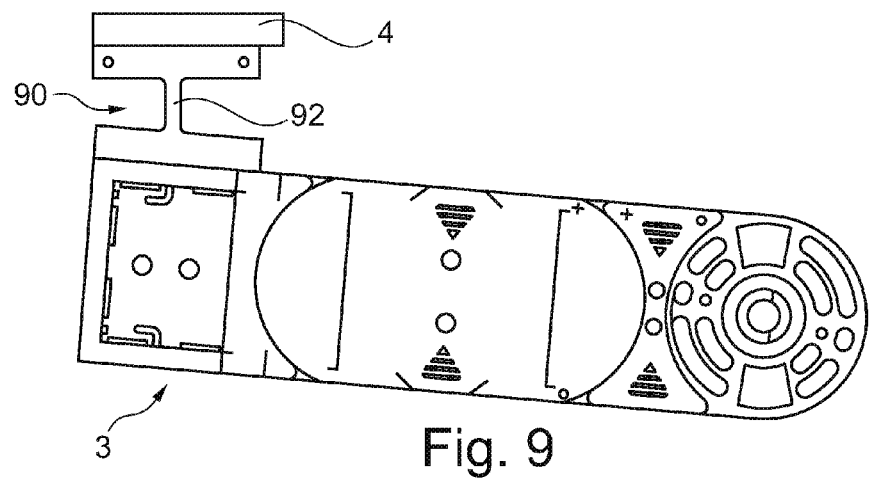

Finally FIG. 9 shows a second possible embodiment of a connecting member 90 according to the invention, which can be used at the same time as the force sensor. In contrast to the first embodiment shown in FIGS. 1-7 the connecting member or the force sensor 90 shown in FIG. 9 only has a single web 92 which extends substantially transversely relative to the direction of the traction/compression force and which is subjected to a flexural stress in operation. This solution is simple in terms of structural configuration and inexpensive, but it suffers from the disadvantage that the engagement angle of the end member relative to the entrainment member is not kept constant and also it is not possible to achieve compensation in terms of measurement results as shown in FIG. 8.

Finally it should also be mentioned that, in an embodiment as shown in FIG. 3, with a respective connecting member 10 at each side plate line array 7, 8, sensors like for example strain gauges 621, 622; 641, 642 for measuring the deformation produced by flexing do not necessarily have to be provided in each of the two connecting members. It is also possible for a connecting member 10 which serves at the same time as the force sensor to be provided only in the left-hand or the right-hand side plate line array 7, 8, whereas the other side plate line array only involves a connecting member with a frame structure 20 of the same structural configuration as shown in FIG. 5A, but without strain gauges as shown in FIGS. 6A-6C. The use of force sensors 10 for each respective side plate line array 7, 8 however provides a higher degree of measuring accuracy and a higher level of safeguard by virtue of redundancy.

LIST OF REFERENCES

1 energy guide chain
2 chain link member
3 moveable end
4 entrainment member
5, 6 direction of displacement
7, 8 side plate line array
9 transverse web
10 force sensor or connecting member
12 evaluation unit
14 measuring line
16 data line
18 power line
20 frame structure
22 first flange
23 fixing bore
24 second flange
25 female thread
26 side cover
27 fixing bore
28 connecting socket
32 first web
34 second web
321, 322 flexural regions
341, 342 flexural regions
35 opening
62, 64 connections for power supply source
621, 622 strain gauge
641, 642 strain gauges
66, 68 connections for bridge measurement
90 force sensor or connecting member
92 web

What is claimed is:

1. A monitoring system for at least one of traction force and compression force in an energy guide chain having a plurality of hingedly interconnected chain link members for protectedly guiding cables, hoses or other lines, including:
   at least one force sensor for measuring at least one of a traction force and a compression force transmitted between an entrainment member and a moveable end of the energy guide chain, and
   an evaluation unit for evaluating the measurement signals detected by the at least one force sensor,
   wherein the at least one force sensor is in the form of a connecting member for fixing the moveable end of the energy guide chain to the entrainment member and includes at least one web extending substantially transversely to a direction of at least one of the at least one traction force and the compression force,
   wherein the at least one web is stressed in flexing in an event of the at least one traction force and compression force acting in a longitudinal direction of the chain and has at least one elastically deformable flexural region with an associated sensor device for measuring a deformation produced by flexing, and
   wherein the at least one force sensor includes a first flange which is made in one piece with the at least one web, the first flange having fixing means to fix the at least one force sensor to the entrainment member.

2. The monitoring system according to claim 1 wherein the at least one web comprises two webs, and the at least one force sensor comprises the two webs, which each include at least one elastically deformable flexural region with an associated sensor device and are arranged parallel with the same operative length in order upon flexing of the webs to ensure parallel displacement of the moveable end of the energy guide chain relative to the entrainment member.

3. The monitoring system according to claim 2 wherein two series-connected strain gauges are respectively provided at each of the two webs, wherein the strain gauges are arranged in symmetrical and diametrically opposite relationship and the series-connected strain gauges are connected in parallel to constitute a Wheatstone bridge so that the strain gauges of each web are respectively connected in series between the two supply terminals of the Wheatstone bridge.

4. The monitoring system according to claim 2 wherein the first flange is made in one piece with the two webs.

5. The monitoring system according to claim 4 wherein the at least one force sensor further includes a second flange which is shaped in one piece and which has fixing means to fix the moveable end of the energy guide chain, wherein a connecting surface on the second flange extends inclinedly relative to a connecting surface on the first flange.

6. The monitoring system according to claim 1 wherein a strain gauge is fixed as the sensor device to the at least one elastically deformable flexural region.

7. The monitoring system according to claim 1 wherein the at least one web is of an operative length which can be stressed in flexing of at least 20% of the lever arm causing flexing, measured between the fixing location on the entrainment member and the hinge axis of the most closely adjacent hinge of the energy guide chain.

8. The monitoring system according to claim 1 wherein the at least one force sensor includes a frame structure which is produced in one piece from metal or plastic and which forms the at least one web and also forms perpendicularly thereto the first flange, wherein the frame structure is in the form of a separate connecting member for fixing the moveable end of the energy guide chain to the entrainment member.

9. The monitoring system according to claim 8 wherein the first flange for fixing to the entrainment member has a fixing profile, in particular a bore pattern, which is identical to a fixing profile of the moveable end of the energy guide chain.

10. The monitoring system according to claim 1 wherein the at least one force sensor, in particular the at least one web, is an integrated component of a chain end member which is in the form of a connecting member for fixing the moveable end of the energy guide chain to the entrainment member.

11. The monitoring system according to claim 1 further comprising the entrainment member wherein the first flange is fastened to the entrainment member.

12. The monitoring system according to claim 11 wherein the first flange has bores or threads, and further comprising screw-type fasteners that cooperate with the bores or threads of the first flange and fasten the first flange to the entrainment member.

13. An energy guide chain comprising a plurality of hingedly interconnected chain link members for protectedly guiding cables, hoses or other lines, wherein the chain link members are respectively formed by side plates which are interlinked by the hinged connections to constitute side plate line arrays, wherein provided at at least one of the side plate line arrays of a moveable end of the energy guide chain is a connecting member, wherein the connecting member is in the form of at least one force sensor for measuring at least one of a traction force and a compression force transmitted between the entrainment member and the moveable end and includes at least one web extending substantially transversely relative to a direction of at least one of the at least one traction force and the compression force, wherein the at least one web is stressed in flexing in an event of the at least one traction force and compression force acting in a longitudinal direction of the chain and has at least one elastically deformable flexural region with an associated sensor device for measuring the deformation produced upon flexing at the flexural region, and wherein the at least one force sensor includes a first flange which is made in one piece with the at least one web, the first flange having fixing means to fix the at least one force sensor to the entrainment member.

14. The energy guide chain according to claim 13 wherein the at least one web comprises two webs, and the at least one force sensor comprises the two webs which each include at least one elastically deformable flexural region with an associated sensor device and are arranged parallel with the same operative length in order upon flexing of the webs to ensure parallel displacement of the moveable end of the energy guide chain relative to the entrainment member.

15. The energy guide chain according to claim 14 wherein two series-connected strain gauges are respectively provided at each of the two webs, wherein the strain gauges are arranged in symmetrical and diametrically opposite relationship and the series-connected strain gauges are connected in parallel to constitute a Wheatstone bridge so that the strain gauges of each web are respectively connected in series between the two supply terminals of the Wheatstone bridge.

16. The energy guide chain according to claim 14 wherein the first flange is made in one piece with the two webs.

17. The energy guide chain according to claim 16 wherein the at least one force sensor further includes a second flange which is shaped in one piece and which has fixing means to fix the moveable end of the energy guide chain, wherein a connecting surface on the second flange extends inclinedly relative to a connecting surface on the first flange.

18. The energy guide chain according to claim 13 wherein a strain gauge is fixed as the sensor device to the at least one elastically deformable flexural region.

19. The energy guide chain according to claim 13 wherein the at least one web is of an operative length which can be stressed in flexing of at least 20% of the lever arm causing flexing, measured between the fixing location on the entrainment member and the hinge axis of the most closely adjacent hinge of the energy guide chain.

20. The energy guide chain according to claim 13 wherein the at least one force sensor includes a frame structure which is produced in one piece from metal or plastic and which forms the at least one web and also forms perpendicularly thereto the first flange, wherein the frame structure is in the form of a separate connecting member for fixing the moveable end of the energy guide chain to the entrainment member.

21. The energy guide chain according to claim 20 wherein the first flange for fixing to the entrainment member has a fixing profile, in particular a bore pattern, which is identical to the fixing profile of the moveable end of the energy guide chain.

22. The energy guide chain according to claim 13 wherein the at least one force sensor, in particular the at least one web, is an integrated component of a chain end member which is in the form of a connecting member for fixing the moveable end of the energy guide chain to the entrainment member.

23. An energy guide chain comprising a plurality of hingedly interconnected chain link members for protectedly guiding cables, hoses or other lines, wherein the chain link members are respectively formed by side plates which are interlinked by the hinged connections to constitute side plate line arrays, wherein provided at at least one of the side plate line arrays of a moveable end of the energy guide chain is a connecting member fixing the moveable end to an entrainment member, wherein the connecting member comprises at least one force sensor for measuring at least one of a traction force and a compression force transmitted between the entrainment member and the moveable end and includes at least one web extending substantially transversely relative to a direction of at least one of the at least one traction force and the compression force, wherein the at least one web is stressed in flexing in an event of the at least one traction force and compression force acting in a longitudinal direction of the chain and has at least one elastically deformable flexural region with an associated sensor device for measuring the deformation produced upon flexing at the flexural region, and wherein the at least one force sensor includes a first flange which is made in one piece with the at least one web, the first flange being fixed to the entrainment member such that the force sensor itself is fixedly connecting the moveable end to the entrainment member.

24. The energy guide chain according to claim 23 wherein the at least one web comprises two webs, and the at least one force sensor comprises the two webs which each include at least one elastically deformable flexural region with an associated sensor device and are arranged parallel with the same operative length in order upon flexing of the webs to ensure parallel displacement of the moveable end of the energy guide chain relative to the entrainment member.

25. The energy guide chain according to claim 24 wherein two series-connected strain gauges are respectively provided at each of the two webs, wherein the strain gauges are arranged in symmetrical and diametrically opposite relationship and the series-connected strain gauges are connected in parallel to constitute a Wheatstone bridge so that the strain gauges of each web are respectively connected in series between the two supply terminals of the Wheatstone bridge.

26. The energy guide chain according to claim 24 wherein the first flange is made in one piece with the two webs.

27. The energy guide chain according to claim 23 wherein the at least one force sensor includes a frame structure which is produced in one piece from metal or plastic and which forms the at least one web and also forms perpendicularly thereto the first flange, wherein the frame structure is in the form of a separate connecting member that is fixing the moveable end of the energy guide chain to the entrainment member.

28. The energy guide chain according to claim 23 wherein the at least one force sensor, in particular the at least one web, is an integrated component of a chain end member which is in the form of a connecting member that is fixing the moveable end of the energy guide chain to the entrainment member.

* * * * *